(12) United States Patent
Schneider et al.

(10) Patent No.: US 6,315,516 B1
(45) Date of Patent: Nov. 13, 2001

(54) DEVICE FOR DELIVERING STACKABLE BAG PACKAGES, PARTICULARLY PLASTIC BAGS WITH A BOTTOM FOLD

(75) Inventors: Jakob Schneider, Niederkassel; Hans Bert Wuits, Troisdorf, both of (DE)

(73) Assignee: Lemo Maschinenbau GmbH, Niederkassel-Mondorf (DE)

( * ) Notice: Subject to any disclaimer, the term of this patent is extended or adjusted under 35 U.S.C. 154(b) by 0 days.

(21) Appl. No.: 09/535,713

(22) Filed: Mar. 27, 2000

Related U.S. Application Data
(60) Provisional application No. 60/126,308, filed on Mar. 26, 1999.

(30) Foreign Application Priority Data

Oct. 19, 1998 (DE) .............................. 198 47 932

(51) Int. Cl.[7] .................................................. B65H 31/30
(52) U.S. Cl. ...................... 414/790.4; 414/27; 414/790.7
(58) Field of Search .................. 414/27, 790, 790.4, 414/790.7

(56) References Cited

U.S. PATENT DOCUMENTS 3,625,338 * 12/1971 Cawley ............................ 414/27 X
4,231,558 * 11/1980 Aterianus et al. ................ 414/27 X
5,076,754 * 12/1991 Ebmeyer et al. ................. 414/27 X
5,087,169   2/1992 Tubke .............................. 414/792.9

FOREIGN PATENT DOCUMENTS 38 34 115C1    5/1990 (DE) .

OTHER PUBLICATIONS

Patent Abstracts of Japan, vol. 1996, No. 12 Dec. 26, 1996 and JP 08 217245 A(I A Syst KK; Hirose Minoru Aug. 27, 1996.

* cited by examiner

Primary Examiner—Janice L. Krizek
(74) Attorney, Agent, or Firm—Herbert Dubno

(57) ABSTRACT

An apparatus for delivering stackable bag packages, particularly plastic bags with a bottom fold, with a pin stacking conveyor, from which the bag packages are brought in a relatively simple manner by means of a upward swingable plate into a substantially horizontal delivery position, from which they can be perfectly taken up by a grip hand of a robot and delivered to a receiving station.

7 Claims, 5 Drawing Sheets

DEVICE FOR DELIVERING STACKABLE BAG PACKAGES, PARTICULARLY PLASTIC BAGS WITH A BOTTOM FOLD

CROSS REFERENCE TO RELATED APPLICATION

This application is a replacement for Provisional Application 60/126,308 filed Mar. 26, 1999 and is entitled to the priority thereof and to the priority of German application 198 47 932.8 of Oct. 19, 1998 under the International Convention.

FIELD OF THE INVENTION

The invention relates to a device for delivering stackable bag packages, particularly plastic bags with a bottom fold, by means of a stepwise movable pin stacking conveyor with a pin stacking chain with stacking pins and a receiving station which has a robot with a tongs-like grip hand.

BACKGROUND OF THE INVENTION

A general indication as to the use of a robot by means of which the removal process of plastic bags in stacks from a bag-making and stacking unit can be automated in a receiving station can be found in DE 38 34 115 C1. However in this case the known device is based on the assumption that the individual bags are kept together in the bag stack by using wire brackets. Details regarding the use of the robot in the removal of the plastic bags cannot be found in this reference.

Moreover the reference indicates generally that the use of a robot has so far not developed due to its complexity and high cost.

It is also generally known to eliminate the use of wire brackets for keeping the individual plastic bags together in the bag stack during stack removal. An interlocking of the individual plastic bags into a bag stack can take place in the pin stacking conveyor, because the plastic bags can be fused together by pressure and heat in certain areas, for instance in an area defined by a perforation line. In this way a considerable simplification of the production of plastic bags is achieved, since also the removal of the bag stacks from the pin stacking conveyor is considerably improved and also the packaging of the plastic bags in boxes or the like is noticeably simplified.

However it is up to the operator to watch over the quality of the interlocked bag packages and to prepare their packaging for instance in a cardboard box. These preparations for the packaging in a box creates difficulties especially in the case of plastic bags with a bottom fold. This happens especially because in the stack the plastic bags with bottom fold lying on top of each other build up quicker in the bottom folds area which thicker than in the flat top areas.

Depending on the kind and size of the bag, the bottom areas are inclined to turn over, when the bag package comes to lie in a horizontal or approximately horizontal position. Therefore even with the use of a robot an operator is kept pretty busy in order to produce perfect bag packages. However this is achieved only when the production speed is reduced, so that the delivery machine operator can follow the package preparation.

OBJECTS OF THE INVENTION

It is the principal object of the invention to provide a bag-stack delivery apparatus of this kind mentioned at the outset but which is suitable for the delivery of stackable bag packages, particularly plastic bags with bottom folds, which will further simplify and accelerate the removal and transfer of bag stacks, especially when these are plastic bags with bottom folds stacked in packages, from a pin stacking conveyor to a packaging station, through corresponding automation.

Another object is to obviate drawbacks of earlier bag stack handling machines.

SUMMARY OF THE INVENTION

According to the invention, this object is achieved in that the pin stacking conveyor is provided in the region of the receiving station with a swingable plate which brings the respectively ready bag package from the position wherein it is substantially suspended on the stacking pins into a substantially horizontal position, and the grip hand has two clamping devices arranged diagonally across from each other, which grip the bag package on both sides, as well as a height-adjustable pressure element centrally pressing upon the bag package.

The apparatus according to the invention offers a comparatively simple solution for avoiding the undesirable turning over of the bottom fold area of the plastic bag.

With the apparatus of the invention, the bag package suspended from the pin stacking conveyor is brought by means of the swingable plate into a horizontal position, from which the bag package, held by the pressure element assisted by an associated down-holding element, is seized by the grip hand and engaged on opposite sides by the latter, whereby through a relative motion of the pressure element with respect to the bag package a slight forward buckling of the package is achieved, so that the bottom fold area can no longer turn up.

By means of a robot bearing the grip hand and its transport motion, after the release of the external clamping devices and due to the downwards movement of the pressure element, the bag package can be deposited in a prepared box or the like, whereby the pressure element by forming a V-bend of the bag package can deposit the same from the releasing clamping devices onto the bottom of the box, respectively onto packages already deposited there. However the grip hand does not simply drop the bag package, rather the same is optimally positioned on the last bag package.

The pressure element can be formed by a preliminary bending rod extending substantially in the longitudinal direction of the bag package.

The preliminary bending rod or a rod or bar carrying the same, is fastened via height-adjustable cylinders to a first support plate, which—directly or indirectly—is connected with the outrigger of the robot.

The first support plate, as well as a second support plate inserted into each other, serve for receiving guide rails for therein adjustably supported arms, on which retaining angles of the clamping device having free ends pointing to one side are each attached in pairs. The retaining angles can be adjusted by means of the cylinder-piston units to the dimensions of the respective bag packages to be transported.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
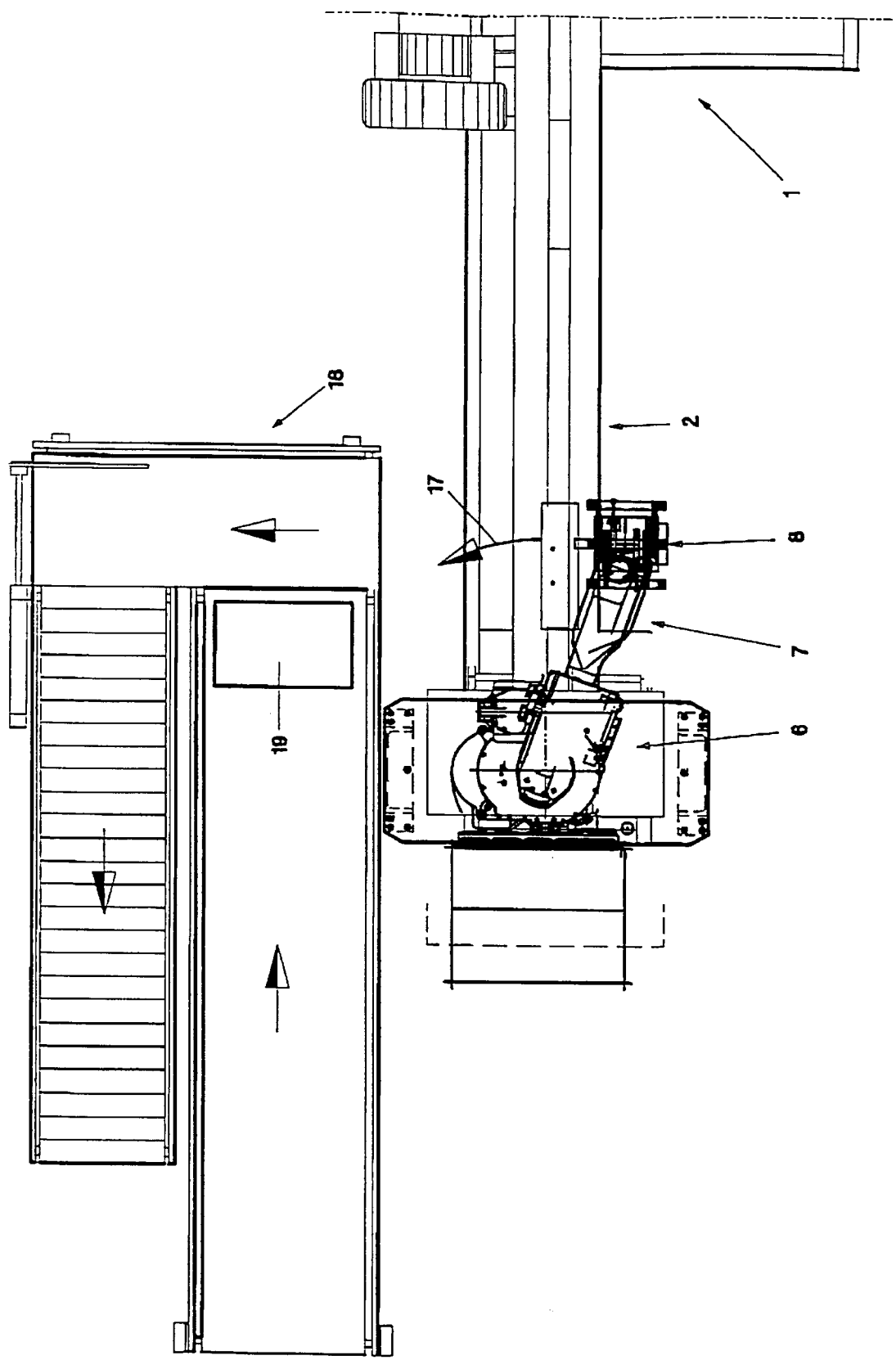
FIG. 1 is a top view of a part of a bag production machine with a pin stacking conveyor, including a robot with a grip hand as well as a receiving station.
Figure 2:
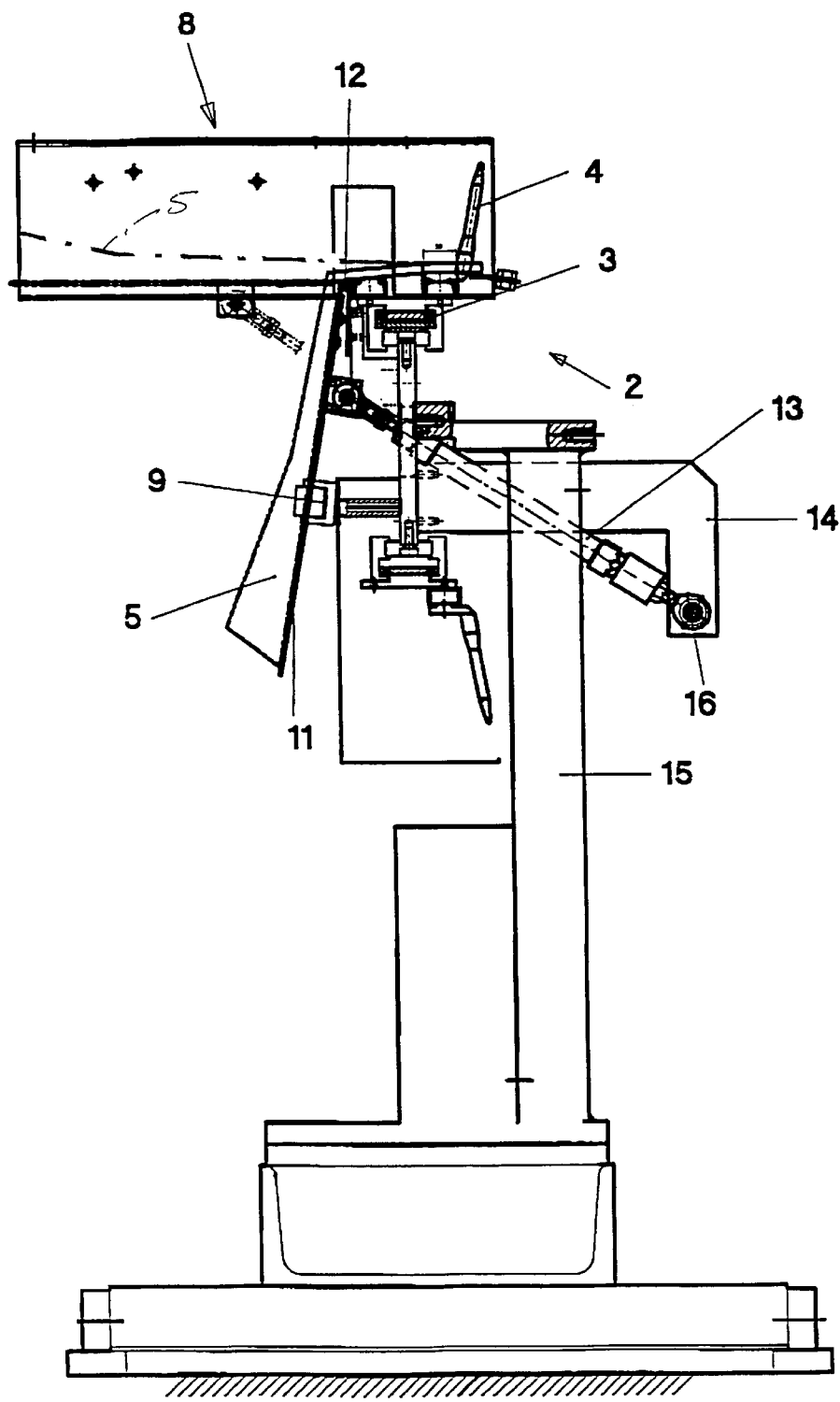
FIG. 2 is a side view of a pin stacking conveyor with a part of the grip hand drawn to a larger scale.

In FIG. 1 a bag manufacturing machine 1 designed and equipped to produce plastic bags, for instance plastic bags with a bottom fold, is schematically represented. For this purpose from a wound roll on a winding stand not shown in the drawing a thermoplastic foil web, which for instance can be a tubular foil web is unwound. Inside the bag manufacturing machine 1 the tubular foil web is guided over not represented drive rollers and tension rollers. By means of equipment which is also not represented, two suspension holes can be made in the plastic foil web and by means of a not represented crosscut-welding device individual bags are separated from the tubular foil web. Finally these bags are transported on a pin stacking conveyor 2 with a stepwise driven revolving pin stacking chain 3. The plastic bags continuously collected on the pin stacking conveyor can be assembled in a known manner to form bag packages. For this purpose the pin stacking conveyor has on its pin stacking chain 3 stacking pins 4 arranged in pairs, on which, as shown in FIG. 2, the bag package 5 is suspended through the suspension openings in the bags and points downwards basically hanging freely. The bags collected in packages are interlocked in the known manner in the pin stacking conveyor, e.g. to form pads from which the bags can later be separated as need arises.

After an interlocked bag package 5 has been formed on the pin stacking chain 3, the finished bag stack at the end of the pin stacking conveyor 2 is removed with the aid of a robot 6 arranged at the end of the pin stacking conveyor 2, which carries a grip hand 8 at the end of an outrigger 7. The function of the robot and of the grip hand 8 is subsequently explained in greater detail.

At the removal point of the pin stacking conveyor 2 a freely rotatable roller 9 is provided for a better guidance of the bag stack 5, and keeps the bag stack 5 at a slight distance from a plate 11, which is supported swingably about a substantially horizontal axis 12 at the upper end of the pin stacking conveyor 2. With the aid of this swingable plate 11, the bag package 5 can be brought from the suspended position shown in a solid line in FIG. 2 to a substantially horizontal position shown in a dash-dot line in FIG. 2.

The pivotal motion of the swingable plate is effected by an adjusting cylinder 13, which is articulated on an arm 14 of a support frame 15 at 16. FIG. 2 also shows a part of the grip hand 8, in order to indicate the position from which the grip hand 8 seizes the substantially horizontally lying bag package 5 in a manner described in greater detail below, and guides it in the sense of arrow 17 to a receiving station 18, wherein for instance empty cardboard boxes 19 are ready to receive a number of the bag packages 5.

Figure 3:
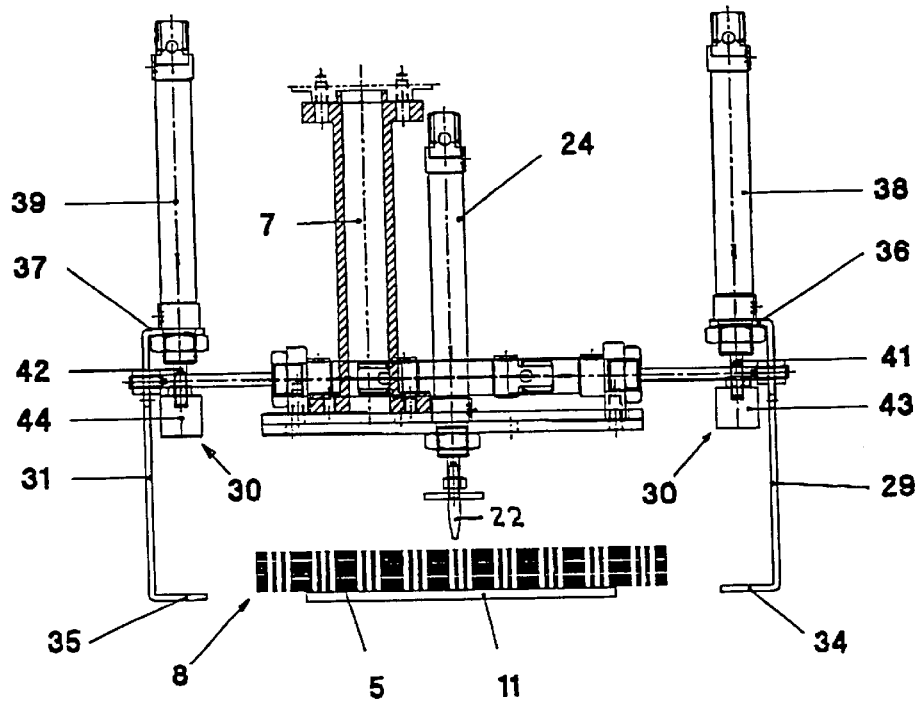
FIG. 3 is a partially sectional view of the grip hand in an expanded position.
Figure 4:
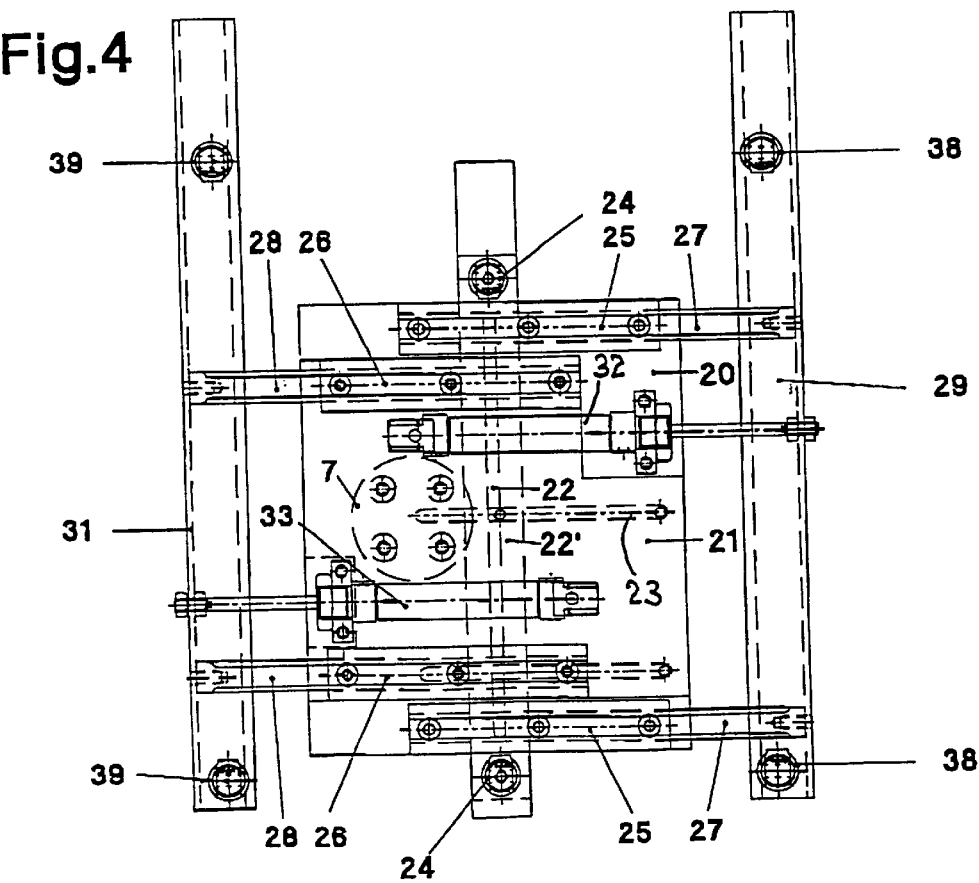
FIG. 4 is a top view of the grip hand.

As can be seen from FIGS. 3 and 4, the grip hand 8 has support plates 20, 21 inserted into one another and mutually slidable over a longitudinal guide 23', one of these plates is fastened on the outrigger 7 of the robot 6. At a distance from the underside of the support plate 20, sits over a support rod 22' a pressure element 22 in the form of a preliminary folding rod.

The preliminary folding rod 22 is height-adjustable by means of an adjusting cylinder 24, namely for the purpose explained further below. On the support plates 20, 21, guide rails 25, 26 are arranged. The guide rails are staggered with respect to each other, in pairs on the one or the other side. The guide rails serve for receiving the slidably supported support arms 27, 28, on which diametrically opposed retaining angles 29, 31 are guided. For the mutual displacement of the retaining angles 29 and 31 into a position receiving the bag package 5 and into a delivery position, respective cylinder-piston units 32, 33 are provided, one of which is fastened to the support plate 20 and the other to the support plate 21. The retaining angles 31 have lower webs 34, 35 and upper webs 36, 37. In each of the upper webs 36, 37 clamping cylinders 38, 39 are fastened, whose piston rods 41, 42 have clamping pieces 43, 44.

Figure 5:
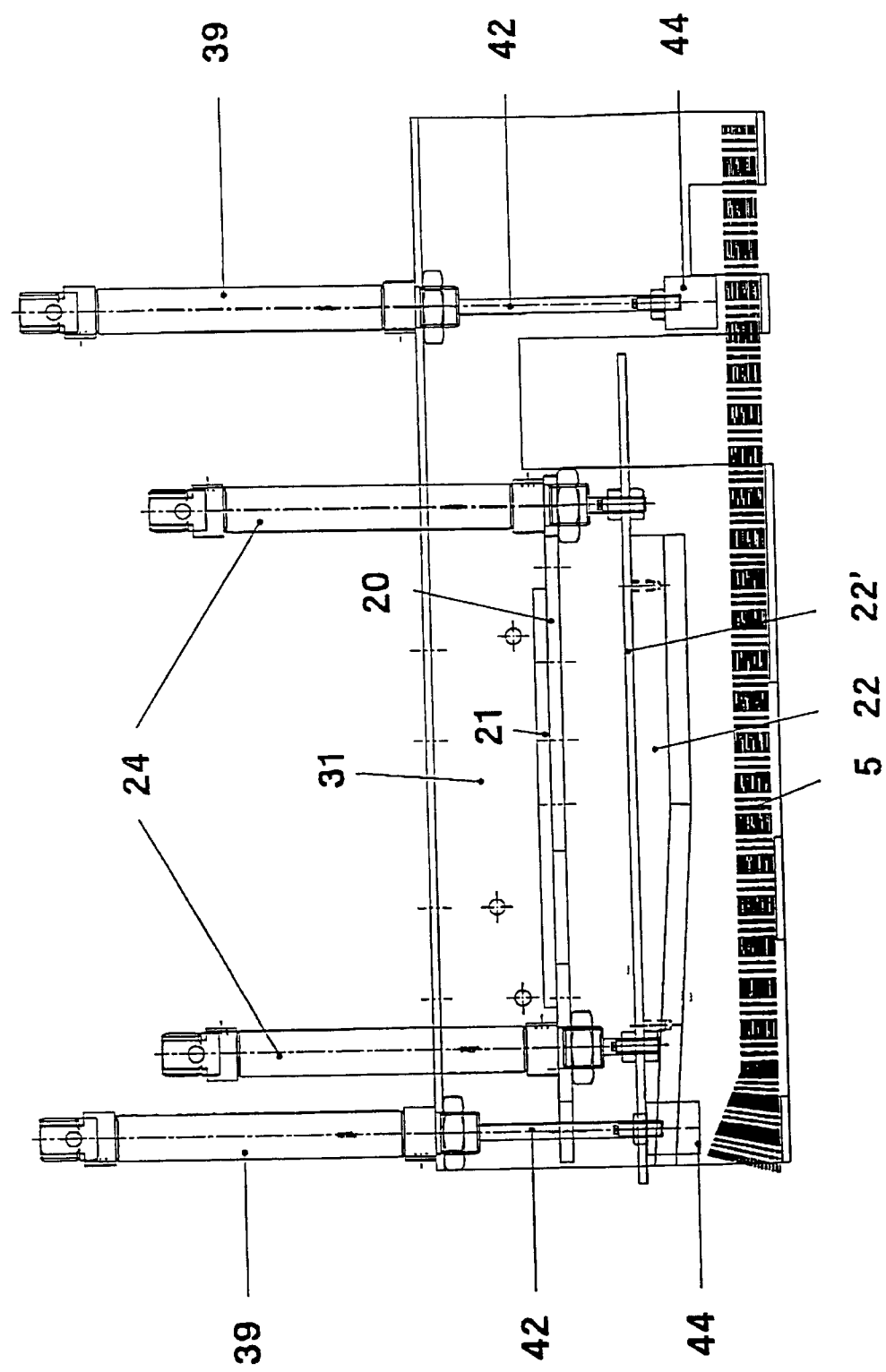
FIG. 5 is a schematic side view of the grip hand.
Figure 6:
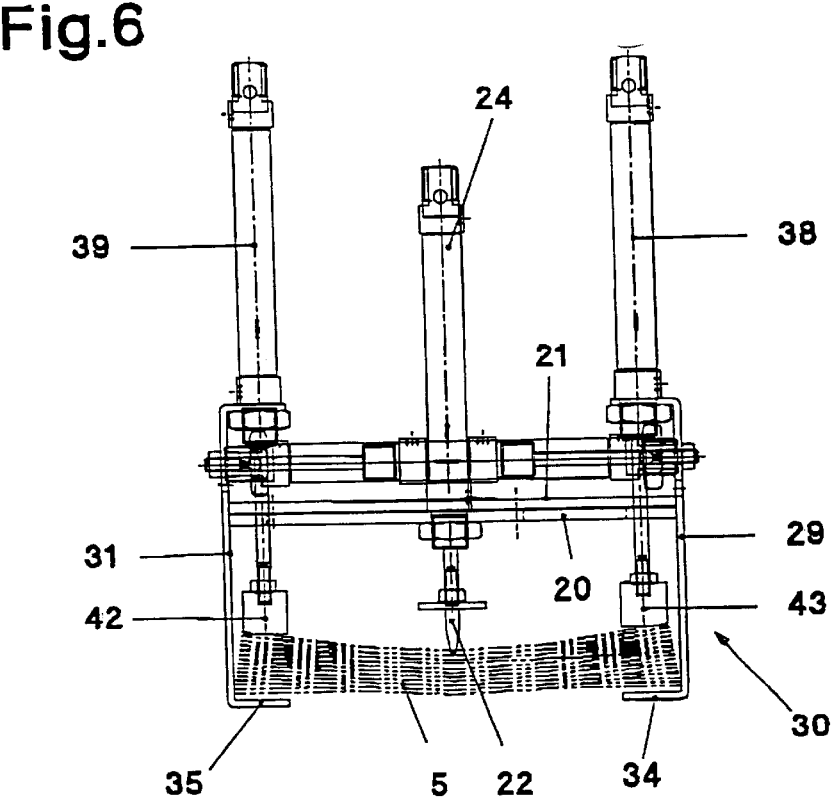
FIG. 6 is a sectional view corresponding to FIG. 3, but in a clamped position of the bag package.

While in the FIGS. 3 and 4 the grip hand 8 is in an extended position with its clamping elements 30, in order to seize a bag package 5, in the FIGS. 5 and 6 the delivery position is shown.

The device according to the invention works as follows:

The grip hand is in receiving position shown in FIG. 3, i.e. the retaining angles 29 and 31 are pushed outward. The swingable plate 11 of the pin stacking conveyor is finally swung upwards via the adjusting cylinder 13, so that the bag package 5 is brought from its substantially free downwards hanging position into the substantially horizontal position shown in FIG. 2, as can also be seen from FIG. 3.

The retaining angles 29, 31 are then moved inwardly via the respective cylinder-piston units 32, 33, so that the bag package is received by the lower webs 34, 35 of the retaining angles 29, 31.

In the inwardly moved holding position, in cooperation with the pressure element 22 the bottom fold area cannot turn inwards. If necessary the bag package can also be slightly buckled in the middle by the preliminary bending rod 22, which runs diagonally upwards with respect to the bottom fold area of the bag package, as indicated in FIG. 6.

Due to clamping cylinders 38, 39, which in the meantime have been expanded, respectively due to clamping pieces 43, 44 on their piston rods 41, 42, the bags or the bag package is held on both sides and the bag package is thus centered in its position. The bag package clamped in this manner is brought with the aid of the robot 6 into a removal position in the area of the delivery station 18, namely so that the grip hand 8 comes to lie above a cardboard box 19 to be filled, and if necessary reaches into the latter.

Figure 7:
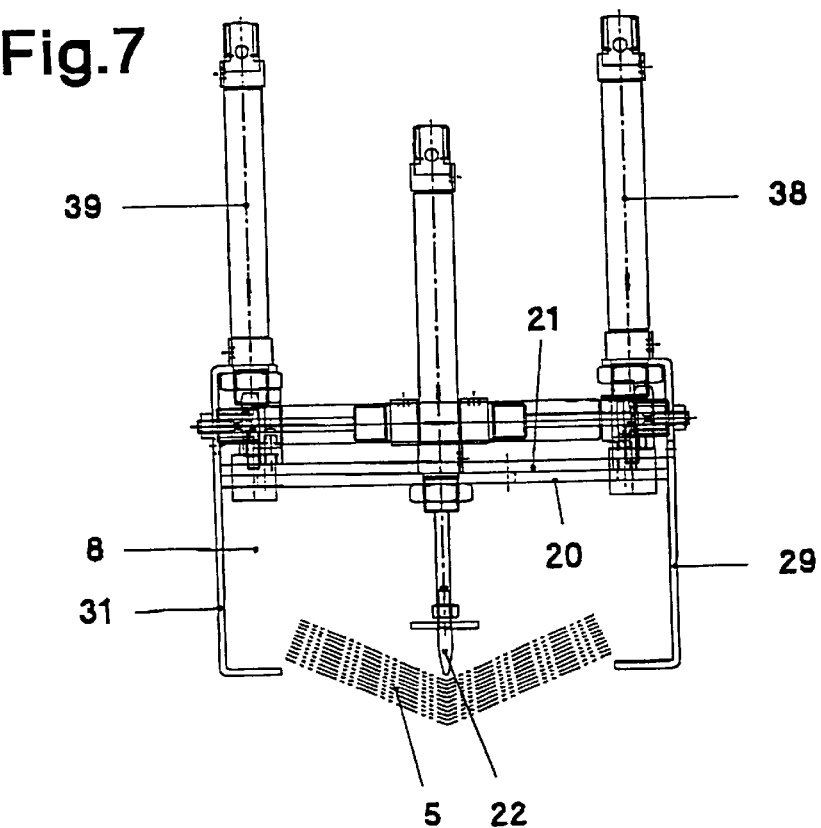
FIG. 7 is a view similar to FIG. 6 in a position of bag package release.

As soon as the correct position is reached, the clamping cylinders 38, 39 retract upwards while the position of the retaining angles 29, 31 does not change, and the pressure element or rod 22 travels outward, so that the package is introduced into the box bent in a V-shape, as indicated in FIG. 7. Through this step it is insured that the thick fold areas cannot turn over, moreover the bag package can be perfectly placed in the readily prepared boxes 19. In the meantime the swingable plate 11 is brought back to its substantially downwardly or oriented initial position.

We claim:

1. An apparatus for delivering stackable bag packages of plastic bags with a bottom fold, said apparatus comprising:

a pin stacking conveyor having a stepwise movable pin stacking chain with stacking pins movable into a delivery position at which bags stacked on said stacking pins and forming respective bag packages are removed from said pin stacking conveyor;

a receiving station for positioning respective boxes adapted to receive said bag packages adjacent said delivery position;

a robot with a grip hand located at an end of said conveyor at said delivery position for transferring said packages from said conveyor to a respective one of said boxes, said grip hand being swingable above said conveyor to remove said packages from said conveyor and place said package in said one of said boxes;

a swingable plate on said conveyor in a region of said receiving station pivotable about a horizontal axis, and each bag package being substantially suspended from respective stacking pins at said receiving station and lying on said plate in a position thereof inclined to the horizontal, said plate being swingable about said axis to bring each package into a substantially horizontal orientation;

spaced apart clamping devices on said grip hand located opposite each other and positioned to seize the bag package on opposite sides thereof for delivery to the respective box; and a height-adjustable pressure element for pressing on the bag package substantially in a middle thereof while said bag package is transferred to said respective box.

2. The apparatus defined in claim 1 wherein the pressure element is formed by a support with a bending rod extending substantially in a longitudinal direction of the bag package.

3. The apparatus defined in claim 2 wherein the rod has a downholder acting upon a fold region of the bag package.

4. The apparatus defined in claim 2 wherein the rod is fastened at a distance from a support plate connected with an outrigger of the robot, on which adjusting cylinders for the rod are mounted.

5. The apparatus defined in claim 4 wherein the support plates carries adjustably supported support arms on which retaining angles of the clamping devices are attached in pairs.

6. The apparatus defined in claim 5 wherein the retaining angles are positionable by means of cylinder-piston units supported on a support plate.

7. The apparatus defined in claim 6 wherein the retaining angles of the clamping devices have lower and upper inwardly angled webs and that on the upper webs clamping cylinders are fastened, whose piston rods carry clamping pieces which extend substantially parallel to the rod.

\* \* \* \* \*